United States Patent
Johns et al.

(10) Patent No.: US 8,305,919 B2
(45) Date of Patent: Nov. 6, 2012

(54) DYNAMIC MANAGEMENT OF END-TO-END NETWORK LOSS DURING A PHONE CALL

(75) Inventors: Kevin C. Johns, Erie, CO (US); David C. Hancock, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 784 days.

(21) Appl. No.: 12/496,090

(22) Filed: Jul. 1, 2009

(65) Prior Publication Data
US 2011/0002229 A1   Jan. 6, 2011

(51) Int. Cl.
*H04L 12/26* (2006.01)
*H04Q 11/04* (2006.01)
*G10L 19/14* (2006.01)

(52) U.S. Cl. ........ 370/252; 358/425; 370/229; 370/235; 370/250; 370/356; 370/392; 375/350; 379/88.08; 379/114.01; 704/205; 709/223; 709/224

(58) Field of Classification Search .................. 358/425; 370/229, 230.1, 232, 235, 241, 249, 250, 370/252, 331, 356, 392; 375/350; 379/88.08, 379/114.01; 704/205; 709/223, 224
See application file for complete search history.

(56) References Cited

U.S. PATENT DOCUMENTS

| | | | | |
|---|---|---|---|---|
| 4,393,491 | A  * | 7/1983  | Ashlock et al. | 370/249 |
| 5,450,449 | A  * | 9/1995  | Kroon | 375/350 |
| 6,370,120 | B1 * | 4/2002  | Hardy | 370/252 |
| 7,006,435 | B1 * | 2/2006  | Davies et al. | 370/230 |
| 7,050,400 | B1 * | 5/2006  | Chen et al. | 370/250 |
| 7,379,864 | B2 * | 5/2008  | Lee et al. | 704/205 |
| 7,633,942 | B2 * | 12/2009 | Bearden et al. | 370/392 |
| 8,176,154 | B2 * | 5/2012  | Minhazuddin et al. | 709/223 |
| 2003/0086425 | A1 * | 5/2003 | Bearden et al. | 370/392 |
| 2003/0091165 | A1 * | 5/2003 | Bearden et al. | 379/88.08 |
| 2003/0097438 | A1 * | 5/2003 | Bearden et al. | 709/224 |
| 2005/0226400 | A1 * | 10/2005 | Farber et al. | 379/114.01 |
| 2007/0286179 | A1 * | 12/2007 | Freyman et al. | 370/356 |

* cited by examiner

*Primary Examiner* — Gerald Gauthier
(74) *Attorney, Agent, or Firm* — Brooks Kushman P.C.

(57) ABSTRACT

A method and system of managing end-to-end loss in a manner that allows phone calls to be executed across many networks at desirable end-to-end loss levels, including networks having fixed-loss stratagems, by controlling devices to adjust their local loss or gain in order to establish target end-to-end loss.

18 Claims, 3 Drawing Sheets

DYNAMIC MANAGEMENT OF END-TO-END NETWORK LOSS DURING A PHONE CALL

BACKGROUND OF THE INVENTION

1. Field of the Invention

The present invention relates to methods and system of dynamically managing end-to-end network loss during a phone call.

2. Background Art

FIG. 1 illustrates a fixed-loss system 10 configured to facilitate execution of a phone call between an endpoint 12 of a calling party and an endpoint 14 of a called party where signals are exchanged in a send and receive direction 16, 18 over a network 20. Each time the signals travel from one endpoint 12 to the other 14, a certain amount of loss may be added to the imparted signals to reduce the annoyance caused by echo. This may be done since the primary (non-echoed) audio is attenuated once, whereas the returned echo is attenuated twice (once from talker to listener, and once more from listener back to talker). The loss may also be imparted to reduce signal strength in a manner that facilitates volume control. The loss may also be imparted to control saturation levels and other operating characteristics associated with the phone call. Regardless of the motivation for inserting the loss and the amount of loss inserted, the loss is commonly referred to as end-to-end loss as it represents the amount of loss experienced by signals traveling from one endpoint 12 to the other 14.

Knowing the amount of end-to-end loss in each direction between two endpoints 12, 14 is critical to maintaining a desirable level of quality for the phone call. The amount of end-to-end loss can vary depending on a media connection and network connection. For example, the media connection, generally defined as the phone-to-ear piece connection, can introduce a certain amount of loss, while the network connection, generally defined as the encode-to-decode connection used to carry signaling between the media connections, can introduce another amount of loss.

To insure adequate levels of loss are included within the network 20, the network 20 may be constructed in a manner that fixes the introduced losses at a particular loss value for all phone calls having endpoints 12, 14 within the same network 20. This insures end-to-end loss is proper when both endpoints 12, 14 are on the same network 20, typically by configuring each endpoint to introduce a fixed amount of loss. As illustrated, each of the endpoints introduces −3 dB of loss in both of the send and receive directions 16, 18 such that the total end-to-end loss is −6 dB in each direction 16, 18. (Necessarily, the communications mediums and mechanisms induce additional loss.) The endpoint 12, 14 or devices connected to it may be configured to operate most desirably when the total amount of loss is the same in both directions 16, 18.

While the fixed introduction of −3 db of loss is helpful with respect to calls having endpoints within the same network 20, the fixed loss strategy becomes problematic in maintaining the same amount of loss in both directions 16, 18 if one of the endpoints 12, 14 is outside the network of the other endpoint. FIG. 2 illustrates an inter-network system 30 where execution of a phone call between first and second endpoints 32, 34 requires signals to be carried over first and second networks 36, 38. The first network 36 is shown to operate at an end-to-end loss of −6 dB with the introduction of −3 dB of loss in both of a send and a receive direction 40, 42 while the second network is configured to operate at an end-to-end loss of −4 dB with the introduction of −2 dB of loss in both of the send and receive direction 40, 42.

This inter-network scenario causes sound levels at the first endpoint 32 to be softer than the desired level and at the second endpoint 34 to be louder than the desired level. This type of signal level discrepancy can lead to a number of issues. For example, echo may become an issue if the lower than desired loss at the first endpoint 32 is below that which is required by the first network configuration to eliminate echo. Saturation may become an issue if the stronger than desired loss at the second endpoint 34 causes voice transmissions to interfere with other transmissions, e.g. data. Volume control may become an issue if the lower than desired loss at the first endpoint 32 causes the second endpoint 34 to sound overly quiet.

The fixed-loss configuration shown in FIG. 1 is suitable for endpoints 12, 14 within the first network 20. The inability of the first network 20 to introduce other amounts of loss becomes problematic when one of the endpoints is on a network configured to operate at different loss levels, as described with respect to the inter-network configuration shown in FIG. 2.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
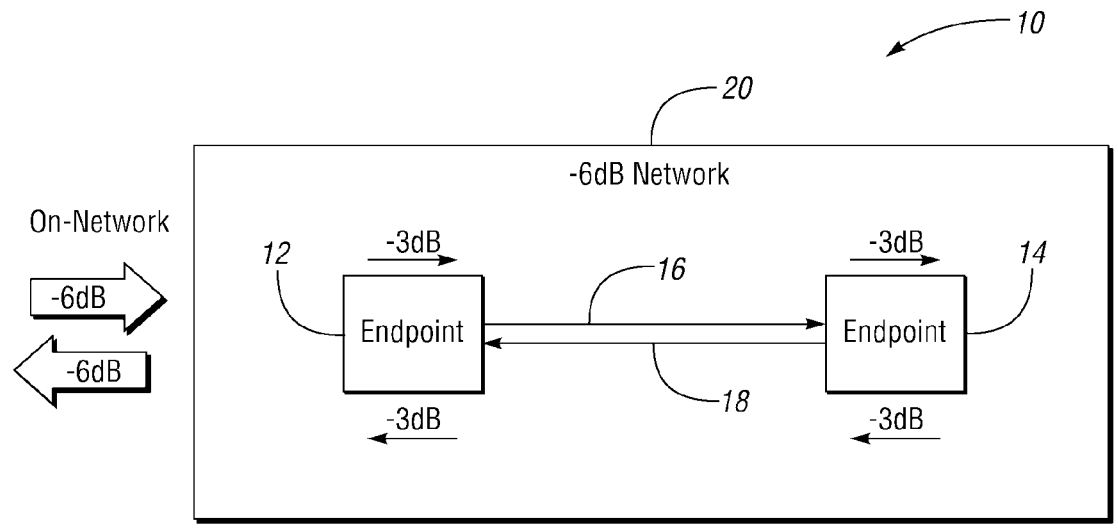
FIG. 1 illustrates execution of a phone call between an endpoint of a calling party and an endpoint of a called party where signals are exchanged in a send and receive direction.
Figure 2:
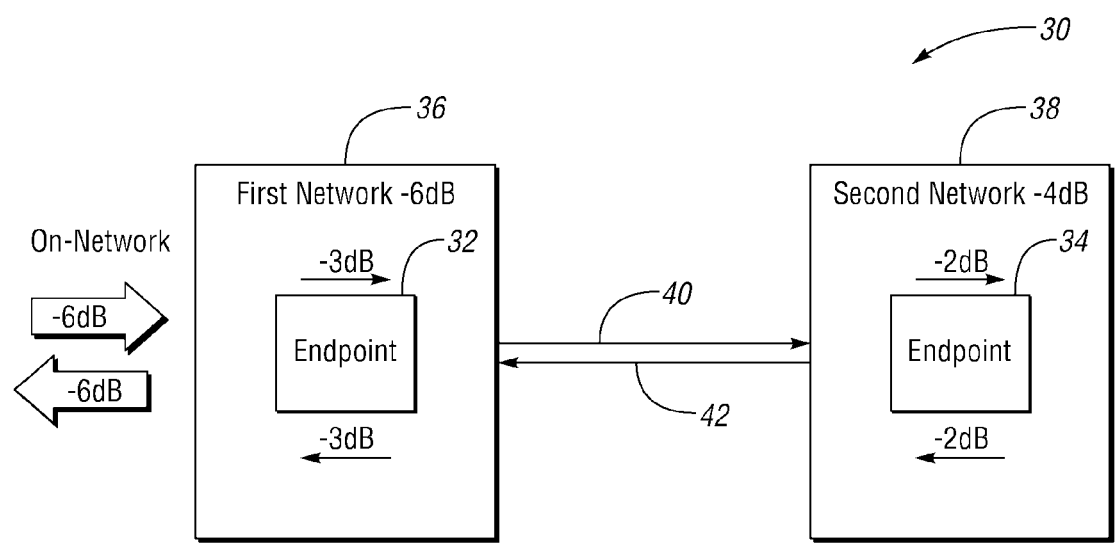
FIG. 2 illustrates execution of a phone call where first and second endpoints are part of different first and second networks.
Figure 3:
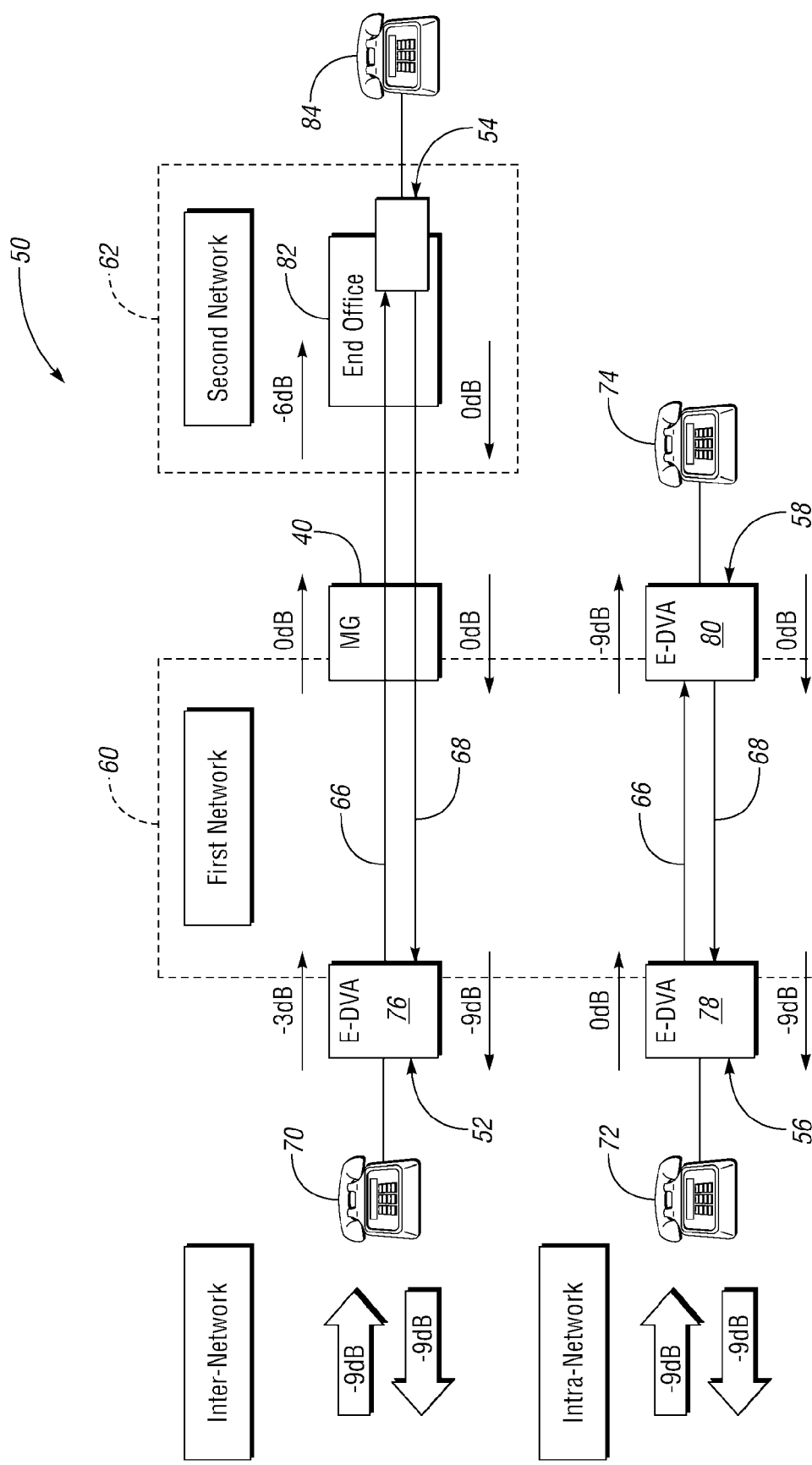
FIG. 3 illustrates a system of managing phone calls between multiple endpoints in accordance with one non-limiting aspect of the present invention.

FIG. 3 illustrates a system 50 of managing phone calls between multiple endpoints 52, 54, 56, 58 in accordance with one non-limiting aspect of the present invention. The system 50 is illustrated with respect to supporting intra-network calls and inter-network calls. The intra-network calls (lower portion) are intended to characterize phone calls where the participating endpoints 56, 58 are within the same network 60. The inter-network calls (upper portion) are intended to characterize phone calls where at least two of the participating endpoints 52, 54 are within different networks 60, 62. For exemplary purposes, the first network 60 is described predominately with respect to being a packet-switched network and the second network 62 is described predominately with respect to being a circuit-switched network. Of course, the present invention is not intended to be limited to only supporting end-to-end loss between packet-switched and circuit-switched networks.

The packet-switched, first network 60 and circuit-switched, second network 62 are illustrated in order to describe one scenario where a phone call may be constructed between networks 60, 62 having disparate end-to-end losses.

A circuit-switched network, such as but not limited to a Public switched telephone network (PSTN), is configured and constructed in a circuit-switched manner to support the phone call related signaling. The circuit-switched configuration is characterized by creating a circuit or other dedicated transmission channel through which data for the phone call is commonly routed—typically with the use of a central/end office or other switch. A packet-switched network, such as but not limited to the type used to support Voice Over Internet Protocol (VoIP) phone calls, is configured and constructed in a packet-switched manner to support phone call related signaling. The packet-switched configuration is characterized by independently routing packets/chunks of data used to support phone calls through various routes, as opposed to the dedicated routing used by circuit-switched networks.

Because of the different routing methodologies, circuit-switched and packet-switched networks 60, 62 tend to be configured to operate using different end-to-end loss plans. The present invention contemplates managing the disparate end-to-end loss issues by dynamically determining and controlling introduction of loss and gain at the endpoints 52, 54, 56, 58 in a manner, for example, that achieves the same end-to-end loss in both of a send direction 66 and a receive direction 68. While the present invention is predominately described with respect to relying on the endpoints 52, 54, 56, 58 to introduce loss and/or gain in either one or both of the send and receive direction 66, 68, loss or gain may also be introduced by other devices associated with supporting communications between the endpoints. For example, an Application Level Gateway (ALG) that is inserted in the media path to perform NAT traversal, or codec or IPv4/6 interworking can also be used to insert loss. This, however, may be less advantageous since such a solution could increase costs and limited scalability, and may add responsibility to the device to ensure that the signaling information required to negotiate the loss values is communicated end-to-end between the two endpoints in the call.

The illustrated endpoints are shown as VoIP phones 70, 72, 74 connected to embedded Digital Voice Adaptors (E-DVAs) 76, 78, 80 and an end office 82 connected to a plain old telephone system (POTS), twisted-pair telephone 84. The illustrated endpoints 52, 54, 56, 58 are only examples of the endpoints 52, 54, 56, 58 contemplated by the present invention. The present invention contemplates the endpoints 52, 54, 56, 58 having any type of device connected to any type of interface for placing voice and non-voice signals onto one of the network 60, 62 for communication to another endpoint 52, 54, 56, 58. Depending on the configuration of the endpoint 52, 54, 56, 58, the user interface end may be remote from the network interface, such as in the case of the second endpoint 54 where the end office 82 is at a relative far distance away from a home having the telephone 84. At the same time, the user interface end may be proximate to or part of the network interface end, such as in the case of the E-DVA 76, 78, 80 being connected directly to the VoIP enabled phone 70, 72, 74.

Regardless of whether the endpoints 52, 54, 56, 58 are integrated units at a subscriber home or separate components located inside and outside of the home, additional components may be included in the communication pathway. One such component may be a media gateway 90 configured to facilitate the exchange of signals between the disparate networks 60, 62, such as by converting or translating data into formats and protocols understood by the particular operating constraints and configurations of the respective networks 60, 62. Unlike the endpoints 52, 54, 56, 58, the media gateway 90 may not be configured to insert loss or gain into the phone call signaling in order to simplify the end-to-end loss management. In some arrangements contemplated by the present invention, however, the media gateway 90 may introduce loss or gain according to fixed or variable introduction stratagem.

The amount of loss or gain introduced by the endpoints 52, 54, 56, 58 may be determined based on the end-to-end loss characteristics of the endpoints 52, 54, 56, 58 with respect to a desired end-to-end loss level. For exemplary purposes, the desired end-to-end loss level is shown to be −9 dB. The desired end-to-end loss level, however, may be set at any level and/or through some agreement between the two networks 60, 62. Once the desired end-to-end loss level is set, one or both of the endpoints 52, 54, 56, 58 participating in a particular phone call (i.e., endpoints 52, 54 for the illustrated inter-network call or endpoints 56, 58 for the illustrate intra-network call) may introduce loss or gain to the send and receive signals so that the end-to-end loss is the same in both directions for both of the intra-network and inter-network phone calls.

The process by which the present invention manages the endpoints 52, 54, 56, 58 to insert the loss or gain is dependent on identification of the endpoints 52, 54, 56, 58 and/or the end-to-end loss characteristics of the network 60, 62 connected to the endpoints 52, 54, 56, 58. For the intra-network call, the endpoints 72, 74 are part of the same network 60 such that the end-to-end loss is consistent throughout due to the network 60 operating according to a strategy when −9 dB of loss is introduced at the endpoint 56, 58 receiving signals, i.e., endpoint 58 for signals traveling in the send direction 66 and endpoint 56 for signals traveling in the receive direction. For the inter-network call, the end-to-end loss introduction strategy of the first network 60 is different from the loss introduction strategy of the second network 62. As such, the endpoint 70, even though it is connected to the same network 60 and the endpoints 56, 58, introduces additional loss in the send direction 66 (−3 db) in order to coordinate end-to-end loss with the loss strategy of the second network 62 so that the same total amount of loss (−9 db) is introduced in both directions 66, 68.

Figure 4:
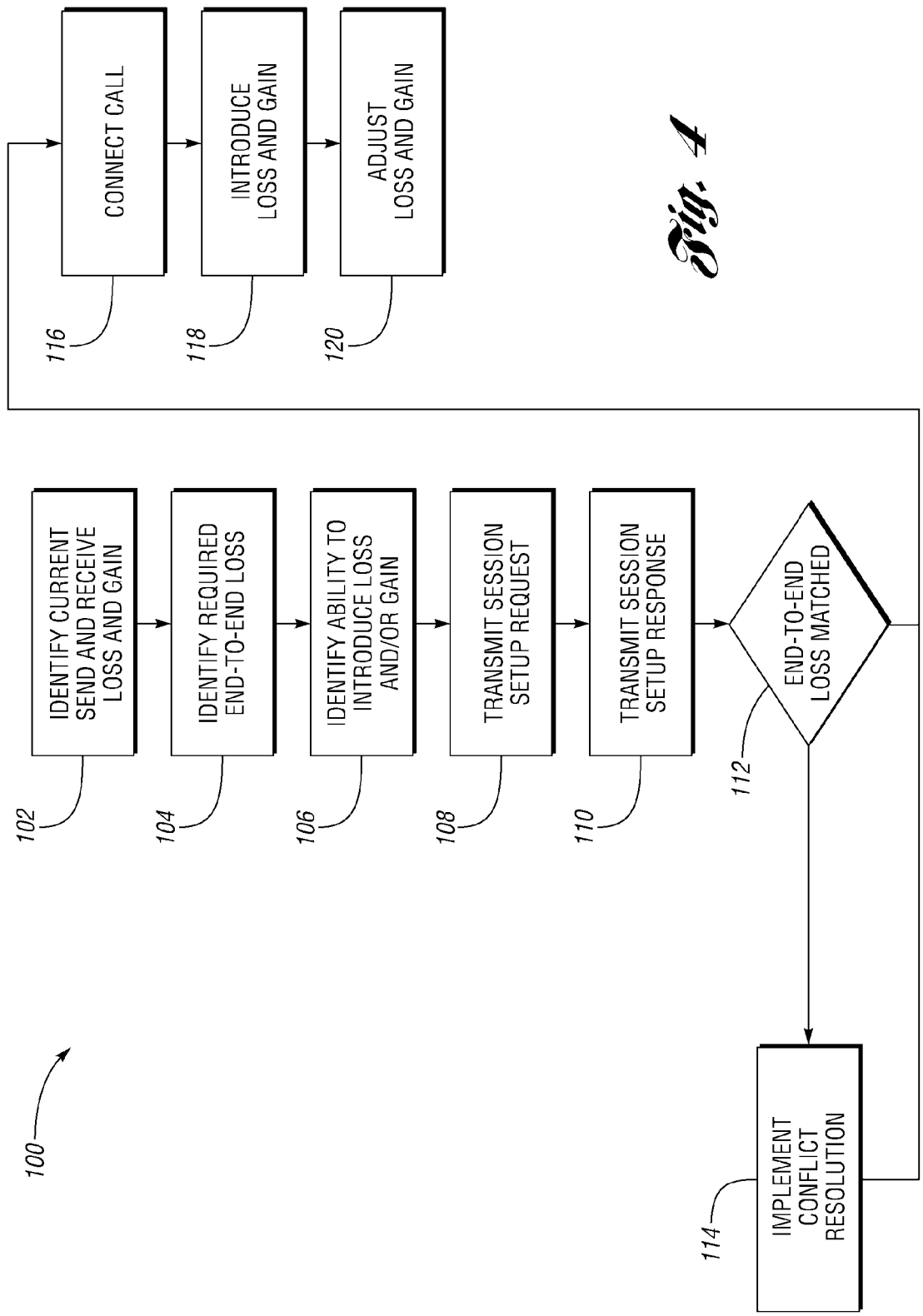
FIG. 4 illustrates a flowchart of a method of managing signal levels for the inter-network and intra-network phone calls in accordance with one non-limiting aspect of the present invention.

FIG. 4 illustrates a flowchart 100 of a method of managing end-to-end loss levels for phone calls, including phone calls of the inter-network and intra-network types described above. The method generally includes identifying the end-to-end loss demands for a phone call and introducing loss or gain to maintain a desired end-to-end loss level for the phone call in order to maximize phone call quality. For the sake of explanation, the method is predominately described without respect to end-to-end loss and controller the amount of introduced loss. This is done without intending to limit the scope and contemplation of the present invention. The present invention fully contemplates introducing gain or implementing other signal manipulations in any manner suitable to achieving the objectives of the present invention.

Block 102 beings the process by identifying current loss characteristics or settings for an endpoint of an originating (calling) party in both a send and receive direction. This may include identifying the loss values introduced by the endpoint in one or more preceding phone calls or the current loss value configured to be imparted by the endpoint. The loss value from a previous phone call may be used to facilitate establishing an end-to-end loss plan for future phone calls to the same called party, i.e., the same strategy can be used if it is known that the endpoint of the called party is still subject to the same end-to-end loss characteristics as the last time the calling endpoint called it.

Block 104 relates to identifying the required or desired end-to-end loss value for phone calls carried out over a network of the originating endpoint, i.e., the network connected to the endpoint that is typically responsible for support phone service to the endpoint. This end-to-end loss may correspond with a desired end-to-end loss level for the endpoint to achieve desired voice quality. In addition to identify the desired end-to-end loss for the endpoint based on its network settings, the process may include Block for identify an ability of the endpoint, or in some cases another device in communication with the network, to introduce loss. This may include identifying an ability of the endpoint to introduce the same or different values of loss according to an amount and direction in which the loss and gain can be introduced as well as whether the introduced loss is fixed or whether it can be varied dynamically on a per phone call basis.

The information collected in Blocks is then added in Block 108 to a session request message sent to the endpoint of the called party. The session request message may be of the type commonly used in session initiate protocol (SIP) to initiate a VoIP phone call. The collection and transmission of this information may be done as part of a period in which a session between the calling and called party is being established through the respective endpoints, i.e., before the call is actually connected and the parties are able to verbally communicate with each other. Since the endpoint transmitting the session request message may not be aware of the capabilities of the receiving endpoint, the information may be appended to one or more messages used to support establishing an SIP session or other communication pathway between the endpoints that is sufficient for supporting the phone call.

Once the terminating endpoint receives the session request message and the appended information, Block 110 relates to the terminating endpoint responding with a session setup response. The response may include appended information similar to that included with the session setup request message sent from the originating endpoint. Block 112 then relates to assessing whether the whether the end-to-end loss of the originating network is in agreement with the end-to-end loss requirements of the terminating endpoint from the information included within the session setup request message. In other words, Block 112 generally relates to assessing whether the two networks, endpoints, phones, etc. have the same end-to-end loss requirements, i.e., whether the desired end-to-end loss level for in the send and receive directions are the same/matched, e.g., −9 dB. The assessment of compatibility may be made by the originating endpoint, an independent entity, such as a server or other remote device, and/or, if the terminating endpoint is capability, from information appended by the terminating endpoint in the session setup response.

If different end-to-end loss requirements are determined, then a conflict resolution processes is implemented in Block 114 to determine an acceptable end-to-end loss plan for the phone call. In some cases, especially if the networks have different end-to-end loss requirements, it may be unlikely that the desired end-to-end loss is currently in place, i.e., some adjustment may be needed to the current loss and gain strategy of at least one of the endpoints in order to achieve the agreed upon end-to-end loss. The plan to adjust the end-to-end loss would typically assume that it is desirable for the loss to be the same in both the send and receive directions, however, the present invention fully contemplates managing introduced loss and gain such that the end-to-end loss levels is not the same in both of the send and receive directions.

The conflict resolution may be implemented in any manner that results in an acceptable end-to-end loss plan. Due to the limitless number of network configurations, there may be a number of processes to determine a suitable end-to-end loss plan. One process may include a negotiation between the endpoints where the endpoints exchange messages to facilitate identify for each endpoints the direction and amount of loss to be introduced. This identification may take into consideration the ability of the ability of the endpoints to introduce and adjust the amount of loss imparted. Like the originating endpoint, the terminating endpoint may communication its ability to introduce loss and the loss requirements of its network to the terminating endpoint. The terminating endpoint may use this information to make a decision of the end-to-end loss plan and/or the information from both endpoints may be transmitted to an independent entity to arbitration the negotiation.

One resolution process may include designating one of the endpoints to adjust its loss or gain to correspond with the current settings of the other endpoint so that only one of the endpoints needs to make an adjustment from its current settings. If one of the endpoints is unable to introduce a sufficient level of loss or gain, then both of the endpoints may be instructed to adjust their strategies in a manner that compensates for the inability of the one endpoint to meet the entire adjustment demand. Once the end-to-end loss value in each of the send and receive directions, as well as an amount and location of where the loss is to be introduced, is agreed determined, the details of the end-to-end loss plan may be scheduled prior to the call being connected in Block 116.

In this manner, the sound component of the phone call begins once the call is connected in Block 116 in the sense that users at the endpoints can now speak with each other. The phone call begins only after establishment of the session between the endpoints, i.e., after the exchange of request and response messages and the exchange of information with respect to loss and gain. Proximate in time to sound being carried between the endpoints, loss is introduced in Block 118 according to the program/sequences determined above. This may, for example, include adjusting the introduction of loss or gain by one or more of the endpoints in the send and/or receive directions, the introduction of loss or gain by a single one of the endpoints, and/or no change in the introduction of loss or gain, i.e., the endpoints operate according to their current settings.

Once the loss and gain is initially implemented in Block 118 it may be monitored by one or more of the endpoints in Block 120. This may include real-time monitoring to check for changes in network loss and gain that surpass a threshold at which the desired end-to-end loss for the phone call degrades to a point where it may be advantageous to add or remove some loss or gain. For example, if unexpected loss or gain is introduced to one or both of the networks, it can be detected and real-time adjustments can be made by one or more of the endpoints. The adjustments may be made within the current session, i.e., without having to create a new session between the endpoints. Optionally, if a fax or other data transmission is desired, an adjustment to loss and gain can be implemented to facilitate transmission of non-voice media between the endpoints. This may be done without terminating the current session in a manner that allows the parties to return to the previous loss and gain settings once the data transmission is complete.

As supported above, one non-limiting aspect of the present invention contemplates end-to-end, send and receive loss for a given media connection to ideally be identical in order to limit a negative feedback situation where, due to their different views of sound level, one talker talks too loudly while the other talks too softly. One example noted above relates to a phone call between a cable network and the PSTN such that the loss plan within a cable operator's network is governed by the loss inserted on the PSTN portion of the media path. It is difficult to establish a single, uniform, end-to-end loss plan for this type of phone call as more and more phone calls are being serviced over packet-switched and circuit-switched networks. The present invention allows one or more of the endpoints to be a participant in the end-to-end loss plan by either inserting loss or adding gain in the media path to achieve a target end-to-end loss value where signaling messages used to establish a media session carry information that allows the loss and gain to be determined and controlled dynamically, on a per-call basis.

One non-limiting aspect of the present invention requires each endpoint to have knowledge (via local configuration) of the required end-to-end loss. At call setup time, the endpoints in the call exchange information in the session establishment signaling messages to enable each endpoint to adjust its locally inserted send and receive loss in order to create the correct send and receive end-to-end loss. This solution assumes that the same end-to-end loss is required for all call types (intra-network, peer-to-peer, or calls to/from the PSTN). This means that the endpoints across a group of peering networks may be configured to require the same end-to-end loss. A conflict resolution process may be implemented to resolve conflicts when two endpoints in different networks disagree on what the end-to-end loss should be.

For example, the rule could be that the originating endpoint always wins, or an average of the two loss values is used. Or, the conflict resolution could be based on bilateral agreement between the peer operators. When both endpoints in a call are capable of adjusting their local loss dynamically, either (or perhaps) both endpoints could adjust their local loss settings to achieve the required end-to-end loss. Optionally, to be algorithmically simpler, one of the two endpoints may be designated to adjust its loss, e.g., the originating endpoint adjusts its loss to accommodate the fixed loss inserted by the terminating endpoint. Other means may be used, however, in the case where the originating endpoint is capable of adjusting its loss only within a narrow range, and therefore is unable to accommodate the fixed loss inserted by the terminating endpoint.

The present invention can accommodate endpoints that are unable to adjust their local loss dynamically, if they are able to report their (fixed) loss in the session establishment messages, by relying on the endpoint that is capable of updating its loss dynamically to adjust its local loss at call setup, time to create the required end-to-end loss. Optionally, one design criteria may assume that loss is inserted only by the endpoints in a VoIP session, and not by any intermediaries that might be inserted in the media path.

Once a terminating endpoint receives a session setup request message, it can inspect the message to determine the required end-to-end loss for the call. If the received end-to-end loss value differs from what the terminating endpoint thinks it should be (based on local configuration data), then the terminating endpoint may adjust the required end-to-end loss value, based on local policy. (Alternatively, it may simply use the received loss value). Once it has determined the end-to-end loss, the terminating endpoint may adjust its local send and receive loss values (in case the originating endpoint is unable to adjust its loss dynamically.)

One non-limiting aspect of the present invention assumes that all calls require the same end-to-end loss, and therefore this single value can be configured in the endpoint. However, there may be cases where the required loss varies based on call type. For example, calls to the PSTN may require a different loss than on-net calls. Since an originating endpoint has no knowledge of where the called endpoint is located, it may not be able to indicate the required end-to-end loss when it initiates a call. This issue can be resolved in a couple of ways. The network (that does know call-type) can adjust the required end-to-end loss value in the session setup messages as they travel en-route between the endpoints. Alternatively, the endpoint can be configured with multiple end-to-end loss values—one per call-type. Then during call setup, the network adds information to the session establishment signaling messages to inform the endpoint of the current call-type, which the endpoint then uses to look-up the required end-to-end loss.

Another factor in determining the correct loss value is the end-to-end delay and local loop length. The endpoint may use other methods for determining the local loop length and end to end delay (e.g., media performance statistics exchanged in real time) to further adjust the local loss. Customers of digital voice services benefit from a consistent product offering with consistent voice levels from one call to the next regardless of which network the other end resides. The present invention is able to rely on static configuration of loss at each network element processing the media stream.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of dynamically determining and controlling end-to-end network loss per phone call, the method comprising;
   determining end-to-end loss between endpoints used to facilitate each phone call;
   determining a desired amount of end-to-end loss for each phone call; and
   individually introducing loss to each phone call where the end-to-end loss is less than the desired amount of end-to-end loss, an amount of loss introduced being proportional to the difference between the end-to-end loss and the desired amount of end-to-end loss.

2. The method of claim 1 further comprising determining the end-to-end loss anew for each phone call during an exchange of messages used to establish a session between endpoints.

3. The method of claim 1 further comprising introducing more loss to one of a send and receive direction relative to the other one of the send and receive direction for phone calls where the end-to-end loss is not the same in both of the send and receive directions.

4. The method of claim 1 further comprising adjusting the amount of loss introduced in-real time as end-to-end losses change.

5. A method of managing end-to-end loss levels of signaling used to support phone calls between multiple endpoints wherein each phone call can be placed only after establishment of a session between at least two endpoints, the method comprising:

during an exchange of messages used to establish the session for a phone call between at least two endpoints:
        (i) identifying current end-to-end loss introduced by each of the endpoints in each of a send direction and a receive direction;
        (ii) determining a desired end-to-end loss plan for the phone call based on a difference between the current end-to-end loss introduced by each endpoint relative a desired amount of end-to-end loss for each of the send and receive directions, the end-to-end loss plan specifying any adjustment required by the endpoints in order to provide the same end-to-end loss in both of the send and receive directions; and
    after establishment of the session, introducing an amount of attenuation to the phone call in order to achieve the desired end-to-end loss plan.

6. The method of claim 5 further comprising determining capabilities of the at least two endpoints to introduce attenuation to the phone call, and introducing the amount of attenuation with at least one of the at least two endpoints based on the capabilities of the at least two endpoints to introduce attenuation.

7. The method of claim 6 further comprising introducing all of the amount of attenuation with a selected one of the at least two endpoints.

8. The method of claim 7 further comprising executing a dispute resolution process to determine the selected one of the at least two endpoints to introduce all of the amount of attenuation in the event that each of the at least two endpoints is capable of introducing all of the amount of the attenuation.

9. The method of claim 6 further comprising introducing a first portion of the amount of attenuation with a first one of at least two endpoints and a second portion of the amount of attenuation with a second one of the at least two endpoints in the event that neither one of the at least two endpoints is individually capable of introducing all of the amount of attenuation.

10. The method of claim 9 further comprising increasing the first portion without increasing the second portion during the pone call.

11. The method of claim 9 further comprising maximizing the first and second portions based on the capabilities of the at least two endpoints in the event that the summation of the first and second portions is less than the amount of the attenuation.

12. The method of claim 6 further comprising introducing the amount of attenuation with an embedded Digital Voice Adaptor (E-DVA) at least one of the at least two endpoints.

13. The method of claim 6 further comprising maintaining the desired end-to-end loss plan at a constant level for multiple phone calls that rely on peer-to-peer, on-net, and mixed-net signaling to support the multiple phone calls.

14. The method of claim 13 further comprising maintaining the desired end-to-end loss plan at the constant level by varying the amount of attenuation introduced during each phone call based on whether the phone call relies on peer-to-peer, on-net, and mixed-net signaling.

15. The method of claim 13 further comprising determining the amount of attenuation needed to achieve the desired end-to-end loss plan to be one of a first value and a second value depending on whether the phone call relies on intra-network or inter-network signaling.

16. The method of claim 6 further comprising dynamically adjusting introduction of the amount of attenuation during the phone call in proportion to end-to-end loss changing during the phone call.

17. The method of claim 6 further comprising introducing a first portion of the amount of attenuation in a transmit direction and introducing a second portion of the amount of attenuation in a receive direction.

18. The method of claim 17 further comprising selecting the first portion to be less than the second portion in the event inter-network signaling is used to support the phone call, the inter-network signaling characterized as requiring signal communications over a packet-switched network and a circuit-switched network.

* * * * *